US010686398B2

(12) United States Patent
DeBartolo, III et al.

(10) Patent No.: US 10,686,398 B2
(45) Date of Patent: *Jun. 16, 2020

(54) SOLAR ENERGY SHADE STRUCTURE

(71) Applicant: Strategic Solar Energy, LLC, Scottsdale, AZ (US)

(72) Inventors: Jack DeBartolo, III, Phoenix, AZ (US); Robert L. Boscamp, Tempe, AZ (US); Thomas Headley, Scottsdale, AZ (US)

(73) Assignee: STRATEGIC SOLAR ENERGY, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/368,481

(22) Filed: Mar. 28, 2019

(65) Prior Publication Data
US 2019/0326848 A1 Oct. 24, 2019

Related U.S. Application Data

(63) Continuation of application No. 15/094,760, filed on Apr. 8, 2016, now Pat. No. 10,277,160, which is a (Continued)

(51) Int. Cl.
H02S 20/23 (2014.01)
E04H 6/02 (2006.01)
(Continued)

(52) U.S. Cl.
CPC ............ H02S 20/23 (2014.12); E04F 10/08 (2013.01); E04H 6/025 (2013.01); F24S 20/67 (2018.05);
(Continued)

(58) Field of Classification Search
CPC . E04F 10/08; E04H 6/025; F24S 20/67; F24S 25/00; F24S 25/13; G06Q 30/00;
(Continued)

(56) References Cited

U.S. PATENT DOCUMENTS 1,822,909 A * 9/1931 Schneider ............... F24D 19/06
52/507
3,309,119 A * 3/1967 Phillips ................... E04C 2/428
403/384
(Continued)

FOREIGN PATENT DOCUMENTS

WO 2018064635 4/2018

OTHER PUBLICATIONS

USPTO; Requirement for Restriction dated May 30, 2013 in U.S. Appl. No. 13/185,190.
(Continued)

Primary Examiner — James M Ference
(74) Attorney, Agent, or Firm — Snell & Wilmer L.L.P.

(57) ABSTRACT

Solar energy shade structures and methods of designing and installing the same are disclosed. These structures are capable of supporting a contiguous planar solar panel support structure at heights greater than 18 feet above their mounting surface. The planar solar panel support structure may contiguously cover at least two areas of different area types, including parking spaces and driving aisles, and may be at least 64 feet long by 64 feet wide. The planar solar panel support structure may have a high panel density defined in that an arrangement of the plurality of solar panels that is uninterrupted by service or access lanes. The majority of the plurality of solar panels may be fixed at an angle that would be non-optimal for energy generation in each individual panel of the majority of the plurality of solar panels, but results in optimal power density for the entire solar energy shade structure.

15 Claims, 11 Drawing Sheets

Related U.S. Application Data continuation of application No. 14/472,876, filed on Aug. 29, 2014, now Pat. No. 9,335,069, which is a continuation of application No. 13/185,190, filed on Jul. 18, 2011, now Pat. No. 8,825,500.

(60) Provisional application No. 61/399,728, filed on Jul. 16, 2010.

(51) Int. Cl.
```
G06Q 99/00     (2006.01)
F24S 20/67     (2018.01)
F24S 25/13     (2018.01)
G06Q 30/00     (2012.01)
E04F 10/08     (2006.01)
G06Q 90/00     (2006.01)
F24S 25/00     (2018.01)
```

(52) U.S. Cl.
CPC .............. *F24S 25/00* (2018.05); *F24S 25/13* (2018.05); *G06Q 30/00* (2013.01); *G06Q 90/00* (2013.01); *G06Q 99/00* (2013.01); *Y02B 10/12* (2013.01); *Y02B 10/20* (2013.01); *Y02E 10/44* (2013.01); *Y02E 10/47* (2013.01); *Y02E 10/50* (2013.01); *Y04S 10/58* (2013.01); *Y10S 136/291* (2013.01)

(58) Field of Classification Search
CPC ........ G06Q 90/00; G06Q 99/00; H02S 20/23; Y02B 10/12; Y02B 10/20; Y02E 10/44; Y02E 10/47; Y02E 10/50; Y02E 10/58; Y10S 136/291
See application file for complete search history.

(56) References Cited

U.S. PATENT DOCUMENTS

| | | | | |
|---|---|---|---|---|
| 3,367,078 A | * | 2/1968 | Thompson, Jr. | E04F 13/045 52/507 |
| 3,413,775 A | * | 12/1968 | Katz | E04F 13/0885 52/834 |
| 4,421,943 A | * | 12/1983 | Withjack | H02S 20/30 136/246 |
| 4,467,584 A | * | 8/1984 | Crites | E04F 13/0733 52/489.1 |
| 4,656,792 A | * | 4/1987 | Clark | E04C 3/42 52/642 |
| 5,107,637 A | * | 4/1992 | Robbins | E04H 1/1211 136/291 |
| 5,109,643 A | * | 5/1992 | Speers | E04B 7/00 52/220.3 |
| 5,125,608 A | * | 6/1992 | McMaster | H02S 20/10 248/163.1 |
| 5,131,955 A | * | 7/1992 | Stern | B64G 1/443 136/245 |
| 5,212,916 A | * | 5/1993 | Dippel | E04B 7/14 52/82 |
| 5,261,435 A | * | 11/1993 | Stanley | E04H 6/04 135/90 |
| 5,279,085 A | * | 1/1994 | DiPaolo | E04H 3/04 52/169.2 |
| 5,335,471 A | * | 8/1994 | Kupiec | E01F 15/003 248/218.4 |
| 5,478,407 A | * | 12/1995 | Dorison | E04B 7/14 136/244 |
| 5,533,306 A | * | 7/1996 | Aspenson | E04B 9/006 52/144 |
| 5,630,297 A | * | 5/1997 | Rutherford | E04B 1/66 52/371 |
| 5,847,537 A | * | 12/1998 | Parmley, Sr. | B60L 8/003 320/109 |
| 5,881,528 A | * | 3/1999 | Grewe | E04C 3/30 52/831 |
| D408,554 S | * | 4/1999 | Dinwoodie | D25/35 |
| 5,956,920 A | * | 9/1999 | Davis | E04C 3/30 52/236.1 |
| 6,009,683 A | * | 1/2000 | Grewe | E04C 3/30 52/301 |
| 6,044,594 A | * | 4/2000 | Desselle | E04B 1/7053 52/101 |
| 6,073,413 A | * | 6/2000 | Tongiatama | E04B 1/26 52/693 |
| 6,176,048 B1 | * | 1/2001 | Berger | E04B 1/70 52/101 |
| 6,185,898 B1 | * | 2/2001 | Pratt | E04B 1/26 52/657 |
| 6,308,469 B1 | * | 10/2001 | Leung | E04B 1/10 411/466 |
| 6,378,810 B1 | * | 4/2002 | Pham | B64G 1/10 244/158.5 |
| 6,421,966 B1 | * | 7/2002 | Braunstein | E04F 10/08 136/244 |
| 6,590,363 B2 | * | 7/2003 | Teramoto | F03D 1/04 320/101 |
| 6,722,357 B2 | | 4/2004 | Shingleton et al. | |
| 6,886,895 B2 | * | 5/2005 | Previte | A47B 47/02 312/213 |
| 6,930,237 B2 | * | 8/2005 | Mattiuzzo | F24S 30/40 136/251 |
| 7,252,083 B2 | * | 8/2007 | Hayden | F24S 30/425 126/600 |
| 7,435,897 B2 | * | 10/2008 | Russell | E04D 3/3608 136/244 |
| 7,531,741 B1 | * | 5/2009 | Melton | H02S 20/32 136/246 |
| 7,647,924 B2 | * | 1/2010 | Hayden | H02S 20/30 126/600 |
| D611,404 S | * | 3/2010 | Mackler | D13/102 |
| D611,405 S | * | 3/2010 | Mackler | D13/102 |
| D643,937 S | * | 8/2011 | Boesch | D25/56 |
| 8,013,569 B2 | | 9/2011 | Hartman | |
| D657,736 S | * | 4/2012 | Mackler | D13/102 |
| D657,737 S | * | 4/2012 | Mackler | D13/102 |
| D657,738 S | * | 4/2012 | Mackler | D13/102 |
| D664,916 S | * | 8/2012 | Conger | F24S 25/50 D13/102 |
| 8,276,328 B2 | * | 10/2012 | Pepin | E04B 1/3483 52/167.3 |
| 8,294,022 B2 | | 10/2012 | Lenox | |
| D672,472 S | * | 12/2012 | Dolceamore | F24S 25/12 D25/22 |
| 8,402,704 B2 | | 3/2013 | Hartley | |
| 8,464,496 B2 | | 6/2013 | Cusson et al. | |
| 8,511,007 B2 | * | 8/2013 | Powers | E04F 10/08 52/173.3 |
| 8,650,812 B2 | * | 2/2014 | Cusson | H02S 20/30 52/173.3 |
| 8,776,454 B2 | | 7/2014 | Zuritis | |
| 8,825,500 B2 | | 9/2014 | DeBartolo, III et al. | |
| 9,335,069 B2 | | 5/2016 | DeBartolo, III et al. | |
| 9,369,083 B2 | | 6/2016 | Lou | |
| 10,044,319 B2 | * | 8/2018 | Zante | H02S 20/23 |
| 10,277,160 B2 | | 4/2019 | DeBartolo, III et al. | |
| 2002/0095896 A1 | * | 7/2002 | Commins | E04B 1/10 52/483.1 |
| 2002/0108332 A1 | * | 8/2002 | Timmerman, Sr. | E04B 1/0007 52/293.3 |
| 2003/0009964 A1 | * | 1/2003 | Trarup | E02D 27/32 52/295 |
| 2003/0034029 A1 | * | 2/2003 | Shingleton | F24S 30/425 126/600 |
| 2003/0042371 A1 | * | 3/2003 | McCahill | E04C 3/02 248/57 |
| 2003/0177706 A1 | * | 9/2003 | Ullman | E04D 13/12 52/3 |
| 2003/0205008 A1 | * | 11/2003 | Sridhara | E04H 9/02 52/167.3 |

(56) References Cited

U.S. PATENT DOCUMENTS

| | | | |
|---|---|---|---|
| 2004/0025931 A1* | 2/2004 | Aguglia | F24S 10/17 136/246 |
| 2004/0065025 A1* | 4/2004 | Durham | E04B 1/3416 52/73 |
| 2004/0261955 A1* | 12/2004 | Shingleton | F24S 20/67 160/84.06 |
| 2005/0035244 A1* | 2/2005 | Conger | F24S 25/50 248/49 |
| 2005/0109384 A1 | 5/2005 | Shingleton et al. | |
| 2005/0227556 A1* | 10/2005 | Robertson | B01D 29/012 442/5 |
| 2005/0241246 A1* | 11/2005 | Sinha | H02S 20/23 52/173.3 |
| 2005/0274060 A1* | 12/2005 | Lederle | A01M 1/24 43/132.1 |
| 2006/0010824 A1* | 1/2006 | Waters | E04C 3/30 52/834 |
| 2006/0054162 A1* | 3/2006 | Romeo | G01S 3/7861 126/600 |
| 2006/0090788 A1* | 5/2006 | Oak | H02S 20/10 136/244 |
| 2006/0090858 A1* | 5/2006 | Heidenreich | E04F 10/0648 160/68 |
| 2008/0216418 A1* | 9/2008 | Durham | E04H 6/025 52/73 |
| 2008/0257402 A1* | 10/2008 | Kamp | H02S 20/23 136/251 |
| 2008/0283112 A1* | 11/2008 | Conger | H02S 20/10 136/244 |
| 2008/0283113 A1* | 11/2008 | Conger | H02S 20/10 136/244 |
| 2009/0031663 A1* | 2/2009 | White | E04H 15/34 52/653.1 |
| 2009/0038672 A1* | 2/2009 | Conger | H02S 20/10 136/244 |
| 2009/0045328 A1 | 2/2009 | Fricke et al. | |
| 2009/0045628 A1* | 2/2009 | Erdman | F03D 80/60 290/44 |
| 2009/0050194 A1* | 2/2009 | Noble | E04B 7/12 136/251 |
| 2009/0094909 A1* | 4/2009 | Cantrell | E04C 2/38 52/202 |
| 2009/0194669 A1* | 8/2009 | Noble | G01S 3/7861 250/203.4 |
| 2009/0199846 A1 | 8/2009 | Collins et al. | |
| 2009/0229200 A1* | 9/2009 | Noble | E04H 12/2261 52/169.13 |
| 2009/0308434 A1* | 12/2009 | Franceschini | H02S 20/10 136/251 |
| 2010/0000165 A1* | 1/2010 | Koller | A01G 9/243 52/173.3 |
| 2010/0000596 A1* | 1/2010 | Mackler | G09F 11/025 136/246 |
| 2010/0043781 A1* | 2/2010 | Jones | F24S 25/65 126/704 |
| 2010/0089433 A1* | 4/2010 | Conger | F24S 25/50 136/244 |
| 2010/0101559 A1* | 4/2010 | Grant | H02S 20/32 126/600 |
| 2010/0108113 A1* | 5/2010 | Taggart | E04F 10/08 135/96 |
| 2010/0132769 A1* | 6/2010 | Potter | E04H 6/025 136/251 |
| 2010/0139645 A1* | 6/2010 | Whipple | H02S 20/24 126/576 |
| 2010/0175741 A1* | 7/2010 | Thorne | H02S 20/32 136/251 |
| 2010/0193013 A1* | 8/2010 | Kong | H02S 20/30 136/251 |
| 2010/0214129 A1* | 8/2010 | Brualla Marti | G09F 19/22 340/944 |
| 2010/0225266 A1* | 9/2010 | Hartman | B60L 11/1825 320/101 |
| 2010/0236183 A1* | 9/2010 | Cusson | H02S 20/24 52/645 |
| 2010/0252092 A1* | 10/2010 | Lenox | F24S 25/60 136/251 |
| 2010/0258110 A1* | 10/2010 | Krabbe | F24S 30/455 126/605 |
| 2010/0263660 A1* | 10/2010 | Thorne | H02S 20/22 126/601 |
| 2010/0275975 A1* | 11/2010 | Monschke | F24S 25/35 136/251 |
| 2010/0308596 A1* | 12/2010 | Gawrisch | E04H 12/003 290/55 |
| 2010/0314509 A1* | 12/2010 | Conger | E04C 3/30 248/121 |
| 2011/0023931 A1* | 2/2011 | Chen | F24S 25/10 136/244 |
| 2011/0030285 A1* | 2/2011 | Kaufman | E04H 6/025 52/82 |
| 2011/0072742 A1* | 3/2011 | Beck | E04H 6/025 52/173.3 |
| 2011/0073161 A1* | 3/2011 | Scanlon | H02S 20/32 136/246 |
| 2011/0094559 A1* | 4/2011 | Potter | H02S 20/10 136/244 |
| 2011/0094569 A1* | 4/2011 | Hartley | E04H 6/025 136/251 |
| 2011/0113705 A1* | 5/2011 | Raczkowski | E01C 1/002 52/173.3 |
| 2011/0131896 A1* | 6/2011 | Hansen | E04B 1/24 52/167.3 |
| 2011/0133689 A1* | 6/2011 | Uchihashi | H02J 7/00 320/101 |
| 2011/0141719 A1* | 6/2011 | Ogura | F21S 8/086 362/183 |
| 2011/0174748 A1* | 7/2011 | Civit Vidal | H02S 20/23 211/1.51 |
| 2011/0221203 A1* | 9/2011 | Miller | F03D 9/007 290/55 |
| 2011/0277809 A1* | 11/2011 | Dalland | H02S 20/10 136/244 |
| 2011/0290305 A1* | 12/2011 | Hoffmann | H02S 20/23 136/251 |
| 2012/0016815 A1* | 1/2012 | DeBartolo, III | E04H 6/025 705/500 |
| 2012/0031456 A1* | 2/2012 | Christman | H02S 20/10 136/244 |
| 2012/0073219 A1* | 3/2012 | Zuritis | F24S 25/65 52/173.3 |
| 2012/0073565 A1 | 3/2012 | Grant et al. | |
| 2012/0131866 A1* | 5/2012 | Batut | E04H 6/025 52/173.3 |
| 2012/0167960 A1* | 7/2012 | Scorsone | H02S 20/10 136/251 |
| 2012/0181973 A1* | 7/2012 | Lyden | H02J 3/383 320/101 |
| 2012/0291374 A1* | 11/2012 | Zante | F24S 25/70 52/173.3 |
| 2013/0076294 A1* | 3/2013 | Smith | H01M 10/465 320/101 |
| 2013/0229141 A1* | 9/2013 | Johnson | G06Q 10/06315 320/101 |
| 2014/0077055 A1* | 3/2014 | Hamilton | H02S 20/10 248/560 |
| 2014/0223844 A1 | 8/2014 | Lou | |
| 2014/0366466 A1 | 12/2014 | DeBartolo, III et al. | |
| 2015/0075588 A1* | 3/2015 | Franklin | H02S 40/32 136/251 |
| 2016/0190974 A1 | 6/2016 | Dickey et al. | |
| 2016/0365826 A1 | 12/2016 | DeBartolo, III et al. | |
| 2017/0298615 A1* | 10/2017 | Janabi | E04B 1/34384 |
| 2018/0041159 A1* | 2/2018 | DeBartolo, III | H02S 20/26 |
| 2018/0048260 A1* | 2/2018 | Ludwig | H02S 30/10 |

(56) References Cited

OTHER PUBLICATIONS

USPTO; Non-Final Office Action dated Aug. 23, 2013 in U.S. Appl. No. 13/185,190.
USPTO; Final Office Action dated Feb. 20, 2014 in U.S. Appl. No. 13/185,190.
USPTO; Notice of Allowance dated May 5, 2014 in U.S. Appl. No. 13/185,190.
USPTO; Requirement for Restriction dated Feb. 3, 2015 in U.S. Appl. No. 14/472,876.
USPTO; Non-Final Office Action dated Apr. 17, 2015 in U.S. Appl. No. 14/472,876.
USPTO; Final Office Action dated Dec. 9, 2015 in U.S. Appl. No. 14/472,876.
USPTO; Notice of Allowance dated Apr. 6, 2016 in U.S. Appl. No. 14/472,876.
USPTO; Requirement for Restriction dated Dec. 19, 2016 in U.S. Appl. No. 15/094,760.
USPTO; Non-Final Office Action dated Apr. 5, 2017 in U.S. Appl. No. 15/094,760.
USPTO; Final Office Action dated Oct. 12, 2017 in U.S. Appl. No. 15/094,760.
USPTO; Non-Final Office Action dated Apr. 26, 2018 in U.S. Appl. No. 15/094,760.
USPTO; Notice of Allowance dated Dec. 11, 2018 in U.S. Appl. No. 15/094,760.
USPTO; Requirement for Restriction dated Feb. 25, 2019 in U.S. Appl. No. 15/721,585.
PCT; International Search Report dated Dec. 22, 2017 in Application No. PCT/US2017/054615.
PCT; Written Opinion of the International Searching Authority dated Dec. 22, 2017 in Application No. PCT/US2017/054615.
PCT; International Preliminary Report on Patentability dated Apr. 2, 2019 in Application No. PCT/US2017/054615 (Matter 616).
PCT; International Search Report and Written Opinion dated Jun. 24, 2019 in Application No. PCT/US2019/24432.
Parking Structure 5-Stadium Dr. ] Business and Finance, printed from https://cfo.asu.edu/solar-stadium on Dec. 9, 2016 alleging Dec. 2008 comissioned dated, pp. 1-2.
SunPower Corporation, Case Study for Foothill-De Anza College District, printed from https://us.sunpower.com/commercial-solar/case-studies/deanza-college/ alleging Apr. 2005 completion dated for the parking system constructed at De Anza College, pp. 1-2.
Strategic Solar Energy LLC, Complaint against Affordable Solar Installation, Inc., Dec. 29, 2016, 30 Pages.
Underground Carpenter publication, http://undergroundcarpenter.blogspot.com/2009/04/springs-preserve-in-las-vegas-nevada.html, Apr. 5, 2009, (accessed Oct. 4 ,2017).
Green Energy vs Actual "Green" Energy, http://www.basinandrangewatch,org/SolarDesert.html, Nov. 1, 2008, (accessed Oct. 4, 2017).
Gibson, "Capturing the Desert Sun," Progressive Engineer Feature, 5 Pages, (2008).
Springs Preserve, Photograph Taken Jul. 29, 2008, https://www.flickr.com/photos/stuartwildlife/2760960352/in/phtotstream, (2008).
Working Railway Station, Photograph Taken Dec. 3, 2009, https://www.flickr.com/photos/nickhi/4155715767, (2009).
Parking Structure 1-apache Blvd.] Business and Finance, printed from https://cfo,asu.edu/solar-apache on Dec. 9, 2016 alleging Jan. 2009 comissioned dated, pp. 1-2.
USPTO; Non-Final Office Action dated Feb. 6, 2020 in the U.S. Appl. No. 16/367,145.
USPTO; Non-Final Office Action dated Jul. 31, 2019 in the U.S. Appl. No. 151/21,585.
USPTO; Notice of Allowance dated Feb. 27, 2020 in the U.S. Appl. No. 15/721,585.

* cited by examiner

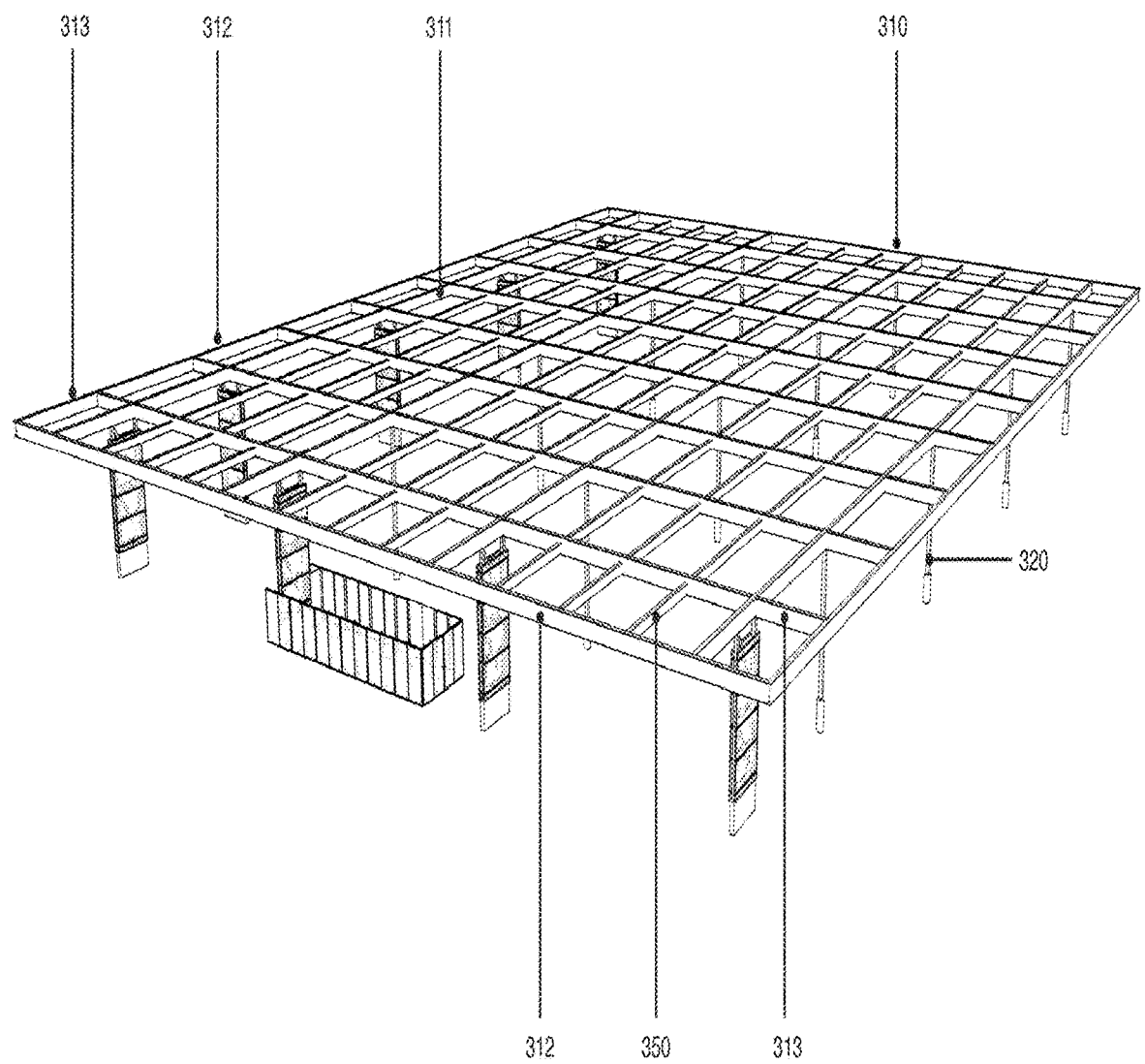

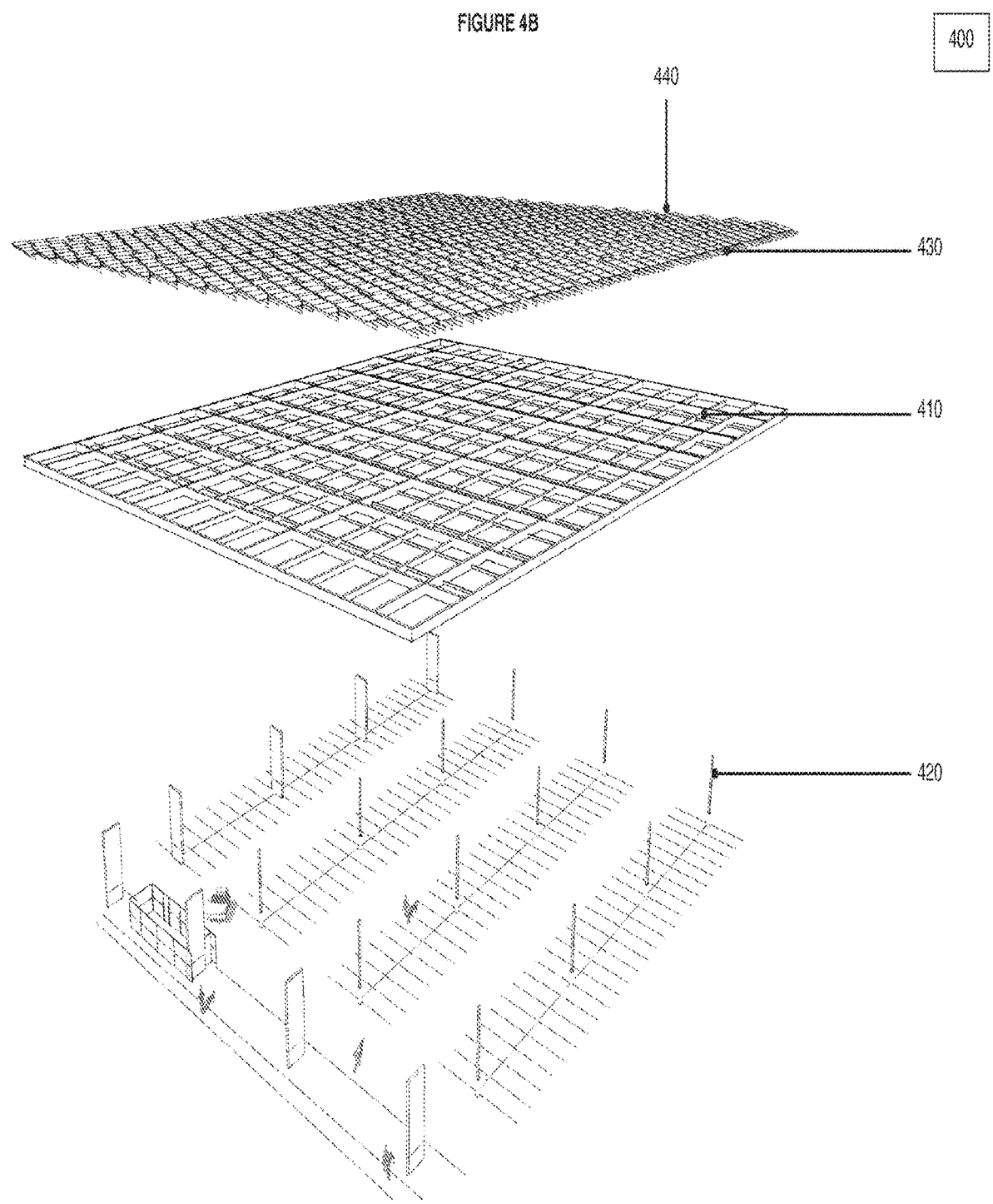

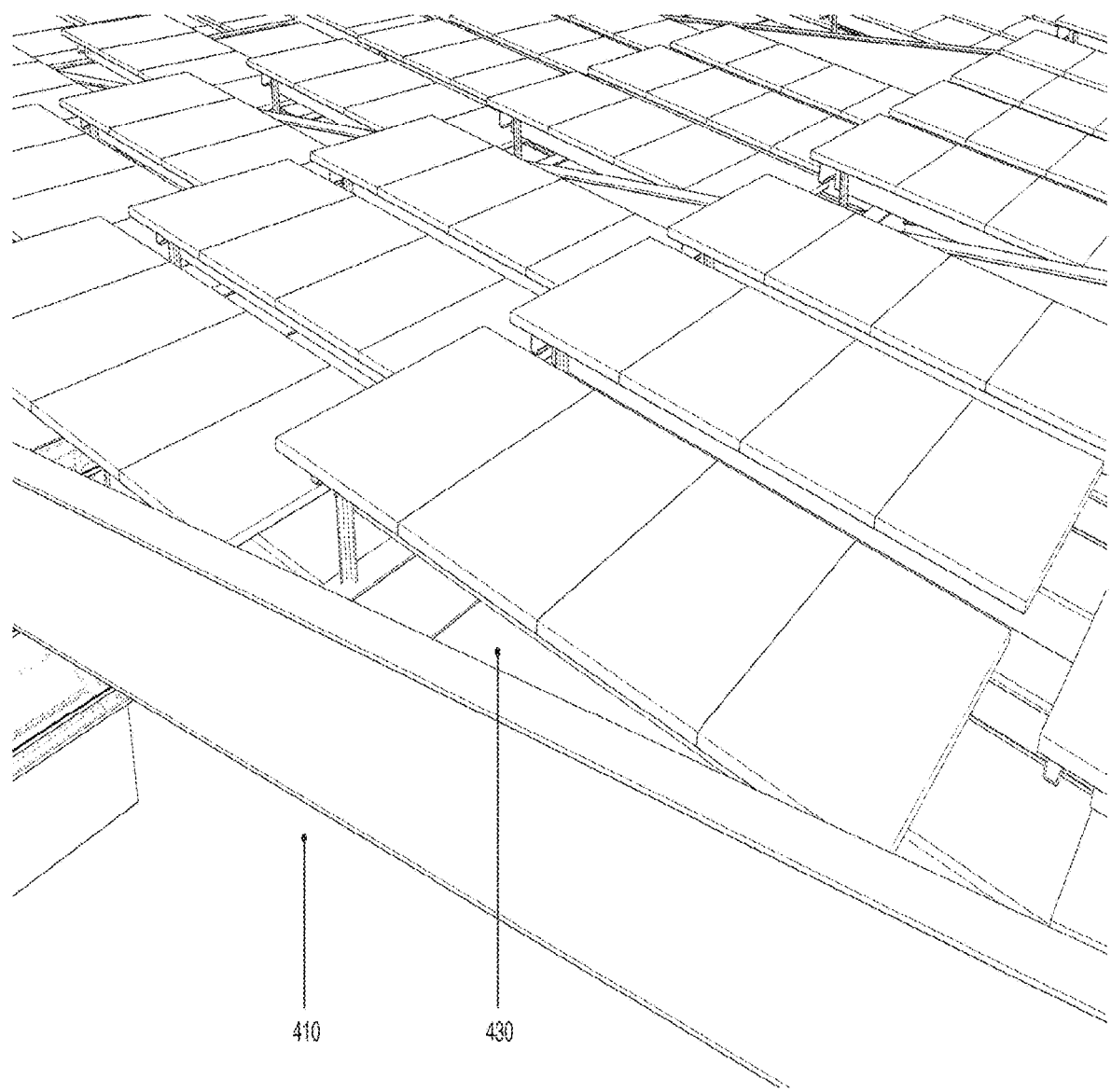

SOLAR ENERGY SHADE STRUCTURE

CROSS-REFERENCE TO RELATED APPLICATIONS

This application is a continuation of U.S. application Ser. No. 15/094,760, filed Apr. 8, 2016, entitled "Solar Energy Shade Structure". U.S. application Ser. No. 15/094,760 is a continuation of U.S. application Ser. No. 14/472,876, filed Aug. 29, 2014, entitled "Solar Energy Collecting Systems and Methods", now issued as U.S. Pat. No. 9,335,069 on Jul. 10, 2016, which is a continuation of U.S. application Ser. No. 13/185,190, filed Jul. 18, 2011, entitled "Solar Energy Collecting Systems and Methods", now issued as U.S. Pat. No. 8,825,500 on Sep. 2, 2014, and claims priority to U.S. Provisional Application No. 61/399,728, filed Jul. 16, 2010, entitled "Solar Energy Collecting Shade Structure", which are herein incorporated by reference in their entirety.

FIELD OF INVENTION

The present disclosure generally relates to apparatus, systems and methods for collecting solar energy and relates more specifically to providing shade and collecting solar energy.

BACKGROUND OF THE INVENTION

There is an unsolved need to collect large amounts of solar energy without causing a large negative impact to the local environment where the energy is collected. Some current solar energy collection technologies collect energy for personal use by mounting photovoltaic solar panels on the rooftops of homes or other buildings. These technologies are fine for personal use but they are restricted to collecting relatively small amounts of energy (50 kilowatts or less). Other current solar energy collection technologies collect large amounts of solar energy (one megawatt to several hundred megawatts) by converting large tracts of land into solar farms. These large installations make a major negative environmental impact on the land they occupy. In addition, large installations require the energy they generate to be transported to the cities where it is needed via new transmission lines. These new transmission lines are costly and have a further negative impact on the environment.

What is needed is a means to collect large amounts of solar energy in cities where the energy is used in a manner that improves and beautifies the local environment and has positive environmental externalities.

A second unsolved problem in the areas of the world which have intense sunshine is that many public and private open spaces are underutilized because the sun makes it uncomfortable for people to use those spaces during much of the year. It is too expensive to provide large amounts of shade for those areas. Additionally, many of the plants native to those areas would thrive in the shade if it could be provided.

What is needed is a cost effective means to provide shade for large public and private open spaces to make the spaces more comfortable for people to use. Furthermore, the shade should be provided in a manner that allows plants to flourish.

A third unsolved problem is that the large parking lots in cities with intense sunshine absorb large amounts of heat from the sun and then later reemit that heat. This absorbing and reemitting of heat is known as the heat island effect and makes the cities hotter during the day and hotter longer into the evening. Examples are large asphalt or concrete parking lots such as are typically found near shopping centers and large business areas.

What is needed is a cost effective means to reduce the heat absorbed by the large asphalt parking lots from the sun and thereby reduce the heat island effect in cities with intense sunshine.

A fourth unsolved problem is a way to minimize the area required to collect solar energy. Typically, once solar is installed on a tract of land the land cannot be used for anything else or has only limited uses. The land is generally fully occupied by being a solar collection facility. Further when the solar panels are placed near the ground, access roads and paths must be created consuming additional land area. Also, the placement of inverters and other necessary equipment such as transmission lines takes up even more land. Finally, the solar panels generally need to be set back away from nearby tall objects such as trees, fences or buildings on adjacent land in order to function efficiently.

What is needed is a means to minimize the amount of land required to collect solar energy and further what is needed is a means to allow the land dedicated to collecting solar energy to be simultaneously used for other purposes.

A fifth unsolved problem is the cost of solar energy. Simply put solar energy costs much more to produce than tradition methods of generating electricity. Thus, a means is needed to reduce or offset the cost of solar energy produced.

SUMMARY OF THE INVENTION

In an exemplary embodiment, a method of generating revenue with a solar structure is provided. This revenue may likely come from three or more sources, including for example, solar panel revenue, shade revenue, and structure revenue. The method includes providing a solar structure comprising a plurality of solar panels. The electricity generated from the solar panels may be sold to produce revenue. Advertising may also be affixed to the solar structure. Revenue may be collected by the solar structure owner from a business for affixing advertising provided by that business. Antennas may also be affixed to the solar structure. Revenue may be collected for affixing the antennas from owners of radio stations, cell phone companies and the like. Further, electric car charging stations may be provided beneath the solar structure. Revenue may be collected from electric car owners for use of the charging station and for power consumed. Revenue may also be generated from fees charged for using the shaded space provided by the solar structure, and from fees charged for parking in the shaded space provided by the solar structure. Donations may also be collected to offset the cost of the solar panels and/or the cost of construction of the solar structure. The names of donors may be displayed.

In an embodiment, the solar structure may be configured with electronic displays such as, for example, televisions or interactive kiosks. These displays may be configured to display information and/or advertising. In an embodiment, the displays may be interactive.

In an embodiment, a method for maintaining a solar structure is provided. The solar structure may have a height of at least 18 feet, a top side facing the sun and an opposing bottom side. The solar structure may comprise a plurality of solar panels. The solar panels may be installed on the top side at an angle between approximately 5 degrees and approximately 15 degrees, and may be accessible from the bottom of the solar structure. To maintain the structure, a user may access a retaining mechanism (not shown) from the bottom side of the solar structure. The retaining mechanism (not shown) may be configured to attach the solar panel to the solar structure. The solar panel may be disconnected from the structure by disconnecting the retaining mechanism (not shown). The solar panel may then be rotated, such that the solar panel passes from the top side to the bottom side. As noted above and as discussed in detail below the solar panels may be installed at varying angles. In an embodiment, the solar panels are installed on the top side at approximately 8 degrees. Moreover, the solar panels may be arranged in any suitable fashion. As such, in various embodiments, the solar panels are arranged to produce between approximately 10 kwh/ft$^2$ and approximately 15 kwh/ft$^2$.

In an exemplary embodiment, a solar panel system comprises a structure installed over a public area. The public area may include for example, a parking lot, a walkway or mall, a public sitting area, a public court yard, an open air market, and/or the like. The structure may be configured to support and retain a plurality of solar panels. The plurality of solar panels may be spaced apart, such that natural light is permitted to pass through the structure. As such, trees and other vegetation may be located under the structure. This height may also allow for a plurality of security cameras to be installed on the structure. The security cameras may be installed at a height of at least 18 feet above the ground and unobstructed by the structure.

The structure may be supported by one or more vertical supports that are at least 20 feet tall. As such, the structure may be elevated such that the solar panels are subjected to a cooling airflow. The structure may also be configured to display advertisements.

In an exemplary embodiment, a solar panel system may comprise a center structure, a side structure and a corner structure. The center structure may have generally rectangular shape having a first length. The side structure may have a generally rectangular shape having a second length and a second width. The side structure may be coupled to the center structure in a cantilevered configuration, wherein the first length of the center structure corresponds to the second length of the side structure. The corner structure may have a generally rectangular shape having a third length and a third width. The corner structure may be coupled to the side structure in a cantilevered configuration, wherein the second width of the side structure corresponds to the third width of the corner structure.

In an exemplary embodiment, the solar panel system may further comprise a plurality of solar panels that are adjustably attached to the center structure. The solar panel system may also comprise a plurality of shade panels, wherein the shade panels are adjustably attached to the center structure. The system may comprise one or more support structures, which is fixedly attached to the corners of the center structure. The support structures may be at least 18 feet tall.

The plurality of solar panels may be uniformly or non-uniformly distributed across the center structure. The non-uniform arrangement may be configured such that light passing through the center structure provides a desired lighting profile. The desired lighting profile may be an approximation of a shade profile of a natural element.

In an exemplary method for designing a solar structure, a photograph is taken to capture the shade profile of a natural element. The photograph may be pixilated and adjusted based on a set of predetermined factors to achieve a design plan. Based on that design plan, a plurality of solar panels may be arranged corresponding to the design plan to approximate the shade profile of the natural element. In an exemplary embodiment, the plurality of solar panels may be installed on a structure in accordance with the design plan in a public area. In accordance with an exemplary method, the predetermined factors may include lifting force load, shearing force load, lighting requirements, and weight requirements.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and where:

FIG. 3 illustrates an exemplary embodiment of joists in place between structural beams;

FIG. 4B illustrates an exploded view of an exemplary installation of a modular structure over a parking area;

FIG. 4C illustrates an exploded view of an exemplary installation of a modular structure over a parking area;

FIG. 6A is a photograph of an exemplary shade profile of a tree branch;

FIG. 6B is an exemplary pixilation of the photograph of the shade profile of a tree branch;

FIG. 6C illustrates an adjustment of the exemplary pixilation of the photograph of the shade profile of a tree branch;

FIG. 6D illustrates a further adjustment of the exemplary pixilation of the photograph of the shade profile of a tree branch corresponding to a design plan for an arrangement of solar panels;

DETAILED DESCRIPTION

Figure 1:
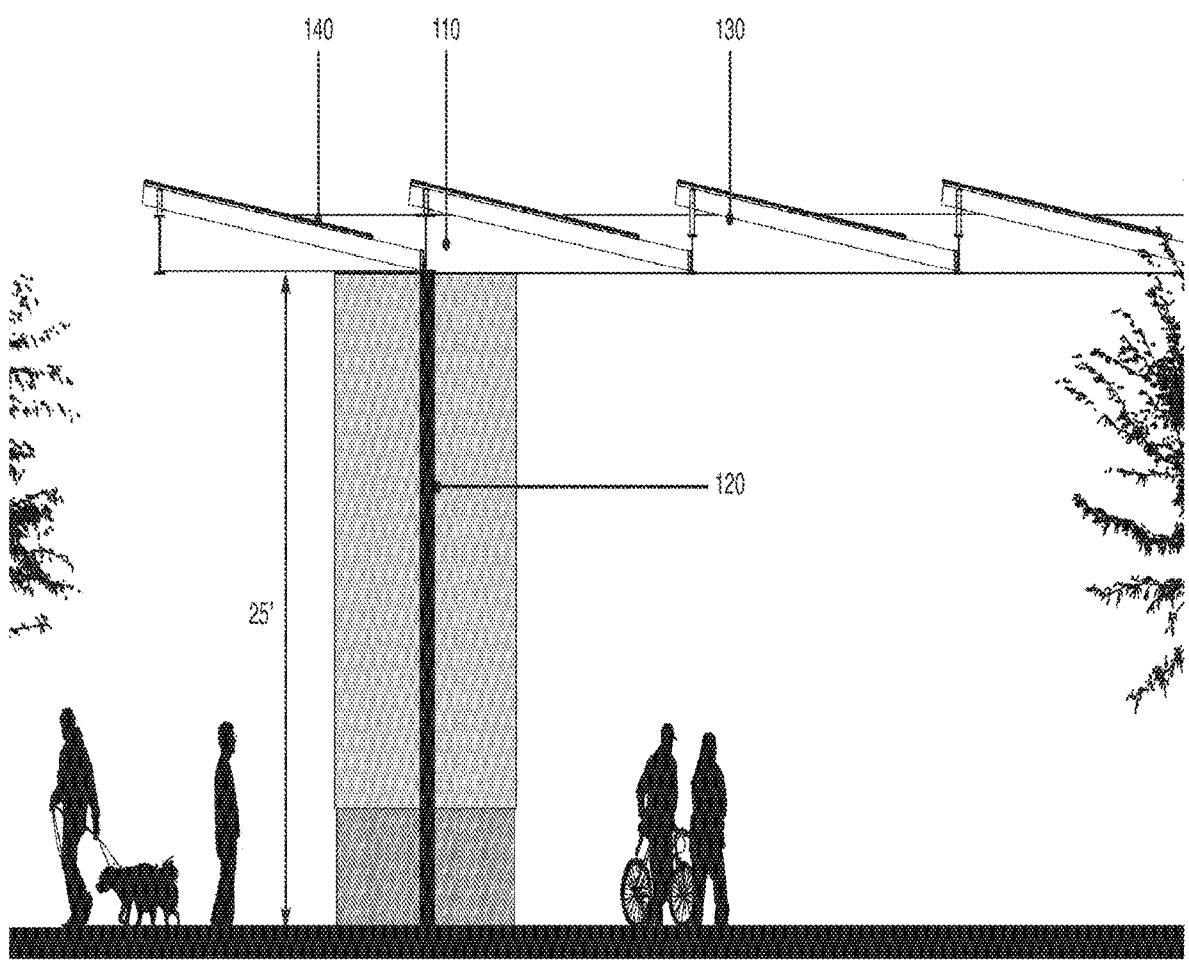
FIG. 1 illustrates an exemplary solar energy collecting shade structure showing people, a car and a tree under the structure.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent exemplary functional relationships and/or physical couplings between various elements. It should be noted that many alternative or additional functional relationships or physical connections may be present in a modular structure.

In an exemplary embodiment, a modular structure comprises minimal structural support components and is capable of supporting a wide variety of solar energy collection panels above the ground. The structure may comprise a center structure module attached to one or more additional structure modules. The structure may be installed in public or private areas including, for example, parking lots, parks, walkways, driving lanes, playgrounds, outdoor markets, sport viewing areas, performing arts areas, and other public or private areas. Moreover, these structures may be configured to be at least 18 feet tall. The structures may also be configured to allow dappled light to hit the ground, which may provide direct sunlight for vegetation and other features located under the structures.

In an exemplary embodiment and with reference to FIG. 1, a modular structure 100 comprises a solar panel holding structure 110 (hereinafter "SPHS 110") and one or more vertical supports 120. In an embodiment, SPHS 110 is mounted to and supported by one or more vertical supports 120. Modular structure 100 may further comprise one or more solar collection panels 130 and one or more shade panels 140. In an embodiment, one or more solar collection panels 130 are installed in SPHS 110. Similarly, one or more shade panels 140 may be installed in SPHS 110.

In an exemplary embodiment, vertical support 120 may be any structure suitable for supporting a shade structure and/or solar panels. In an embodiment, vertical support 120 is taller than a conventional vertical support for a shade structure. For example, in one embodiment, vertical support 120 may be approximately 18 feet to approximately 30 feet tall. In another embodiment, vertical support 120 may be approximately 22 feet to approximately 30 feet tall. In yet another embodiment, vertical support 120 may be approximately 25 feet to approximately 30 feet tall. In still another embodiment, vertical support 120 is approximately 25 feet tall between the ground and the bottom of the solar panel holding structure. The increased height of vertical support 120 provides greater visibility. For example, the increased height of vertical support 120 allows for security cameras to be placed beneath the SPHS 110. This configuration allows security cameras to effectively monitor, while being positioned high enough from public spaces to avoid vandalism, tampering, or an adverse impact on the environment. The increased height of vertical support 120 also provides other advantages. For example, the increased height positions solar collection panels 130 further away from the ground which results in an increase in cooling airflow. This cooling airflow causes solar collection panels 130 to operate more efficiently by maintaining a cooler operating temperature. Also, the increased height reduces the likelihood of adjacent objects of structures shading the solar panels.

In another embodiment, the increased height of vertical support 120 facilitates planting trees, vegetation, and placing structures underneath modular structure 100. For example, large trees and other types of vegetation that are less than 18 feet tall may be included under the structure. These trees and/or vegetation may be strategically placed under modular structure 100 so that they receive sunlight that is allowed to pass through modular structure 100. Moreover, the ability to include trees and vegetation provides cooling and environmental ambiance not possible to obtain if the structure does not permit such vegetation due to its low clearance.

In an exemplary embodiment, solar collection panel 130 is any device or apparatus configured to receive sunlight and generate electricity. Moreover, solar collection panel 130 may also provide shade. In one embodiment, solar collection panel 130 is a photovoltaic solar panel. Solar collection panel 130 may be of any suitable size, including for example, a 4 foot by 8 foot panel.

In an exemplary embodiment, shade panel 140 may be any device or apparatus configured to provide shade. Shade panel 140 may be made of any suitable material, including for example, a textile, wood, metal, plastic, or any other suitable material capable of providing shade. In one embodiment, shade panel 140 may be an artistic element. Shade panel 140 may be opaque or translucent. Shade panel 140 may also comprise one or more colors. Shade panel 140 may also include a design element. This design element may be visible from above or below modular structure 100. Moreover, in an exemplary embodiment, the design elements are arranged to create visual creative works, messages, and/or art. In an embodiment, shade panel 140 may be the same size or half the size of solar collection panel 130. Shade panel 140 may also be proportionally sized such that it may be installed with SPHS 110 with solar panels 130 to provide an aesthetically pleasing appearance. In one embodiment, shade panel 140 may be any suitable size.

Figure 2:
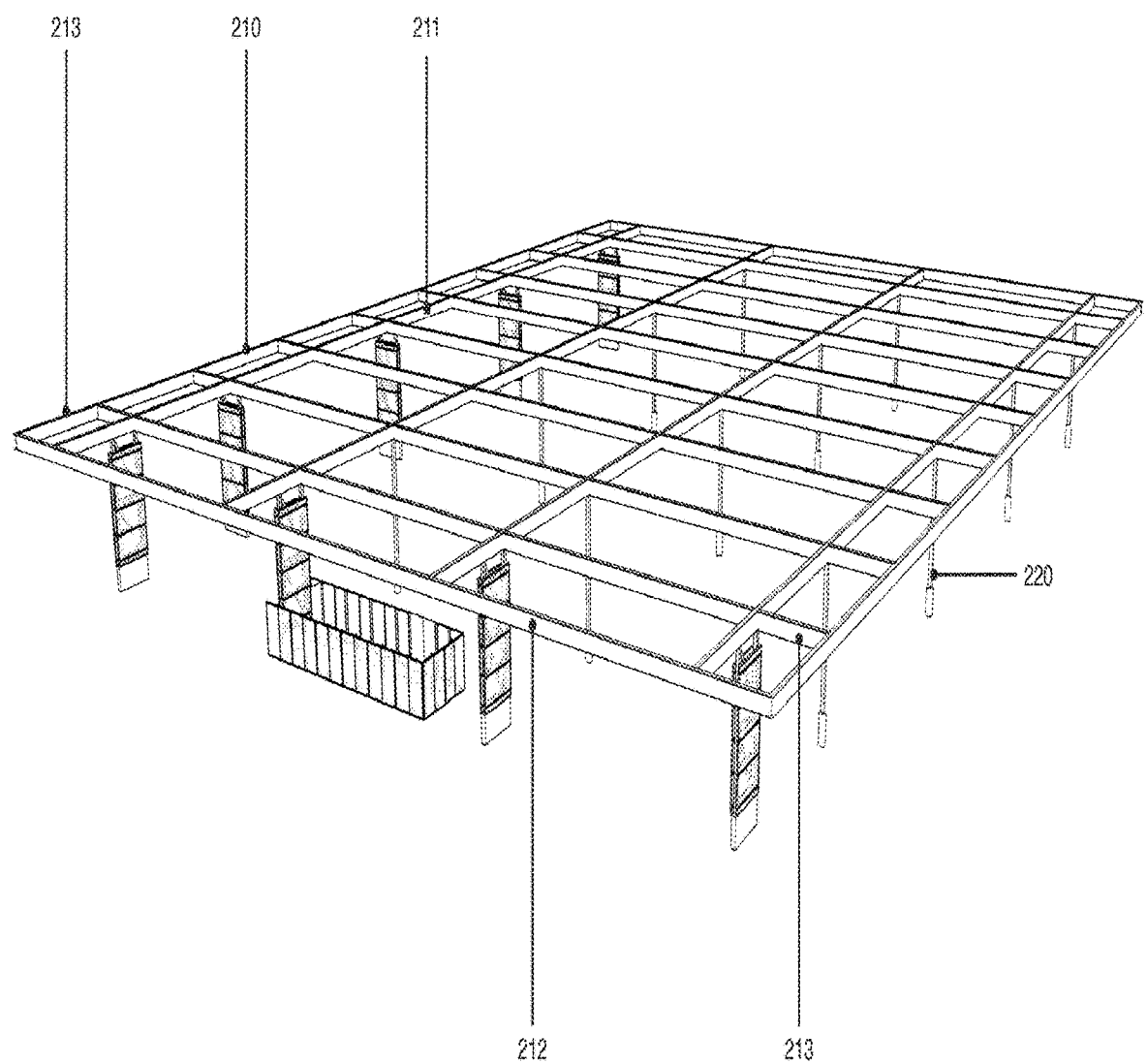
FIG. 2 illustrates an exemplary embodiment of the columns that are attached to the edges of a Center Structure Module.

In an exemplary embodiment and with reference to FIG. 1 and FIG. 2, SPHS 110 is any structure configured to support one or more solar collection panels. SPHS 110 may, in various exemplary embodiments, also support one or more shade panels 140. In various embodiments, SPHS 110 may be modular or may have a unitary design. In one embodiment and with specific reference to FIG. 2, SPHS 210 is modular and may comprise a center section 211. SPHS 110 may further comprise at least one of one or more side sections 212 and one or more corner sections 213. In an embodiment, center section 211, side section 212 and/or corner section 213 may have horizontal structural beams around their edges.

In an embodiment, side section 212 is configured to couple to center section 211. Similarly, corner section 213 may be configured to couple to side section 212 or center section 211. In an embodiment, one or more corner section 213 and/or one or more side section 212 may be coupled to center section 211 in cantilevered arrangements. The cantilevered arrangements provide modular structure 200 with an architectural lightness. Moreover, in various embodiments, one or more side sections 212 and one or more corner sections 213 may be coupled to center section 211 to provide customizable SPHS 210. This allows modular structure 200 to be sized to fit the specific needs of the installation environment, site and context.

Figure 4A:
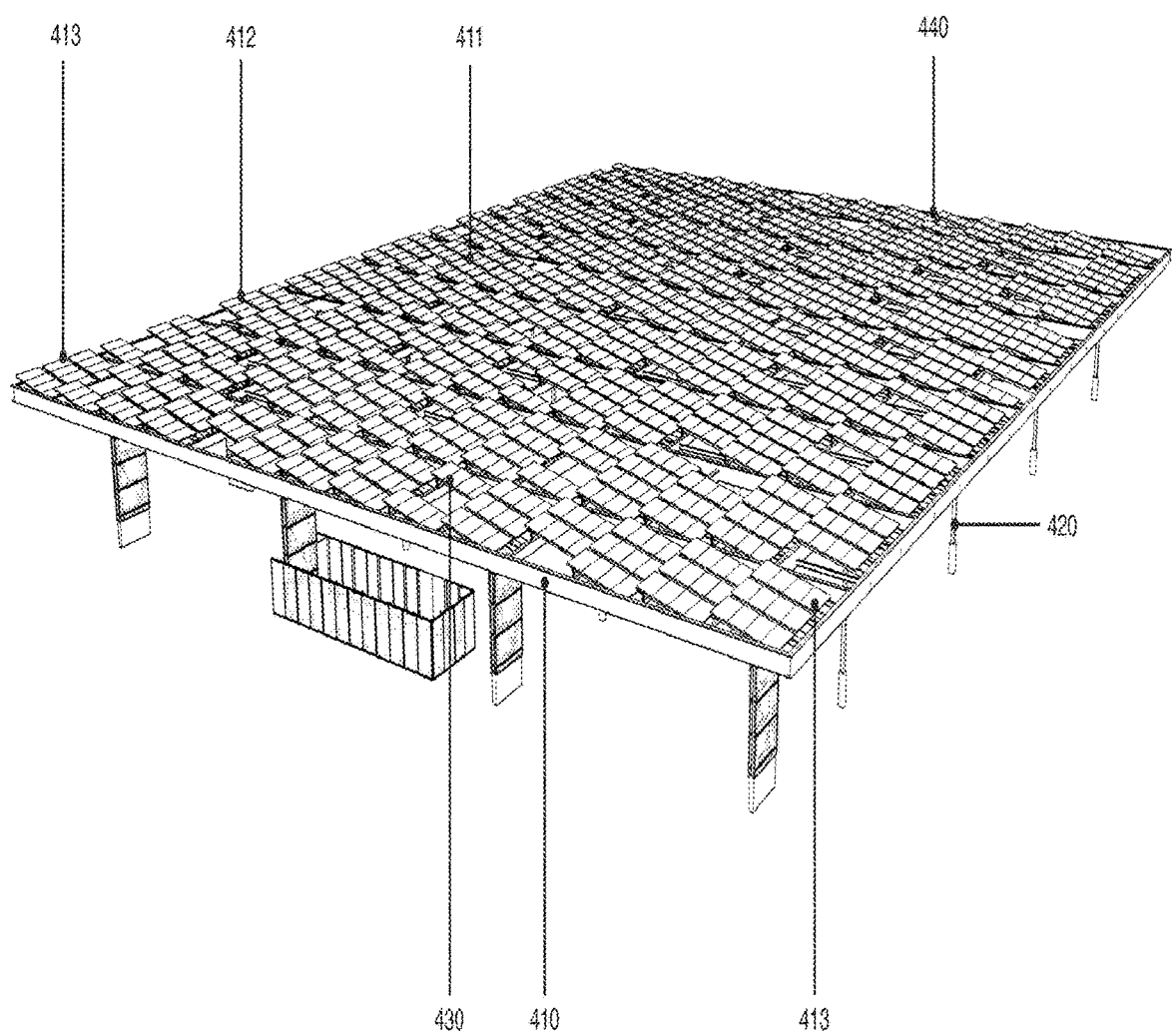
FIG. 4A illustrates a perspective view of an exemplary a modular structure including solar panels arranged to achieve dappling beneath the modular structure.

In an embodiment, center section 211 may be approximately 64 feet by 64 feet. In various embodiments, center section 211 may be larger than 20 feet by 20 feet but smaller than 64 feet by 64 feet. Moreover, in other embodiments, center section 211 may be larger than 64 feet by 64 feet but smaller than 128 feet by 128 feet. In an embodiment, side module 212 may be approximately 16 feet by 64 feet. In various embodiments, side module 212 may be larger than 8 feet by 20 feet but smaller than 16 feet by 64 feet. In various other embodiments, side structure 212 may be larger than 16 feet by 64 feet but smaller than 32 feet by 128 feet. In an embodiment, corner section 213 may be approximately 16 feet on a side. In various embodiments, corner section 213 may be larger than 8 feet on a side but smaller than 16 feet on a side. In various other embodiments, corner section 213 may be larger than 16 feet on a side but smaller than 32 feet on a side. Moreover, in various embodiments, dimensions of center section 211 (see also FIG. 4A, 411), side section 212 (412), and corner section 213 (413) vary within a single structure. This allows modular structure 200 to cover any space. For example, in a parking lot installation, modular structure 200 may be laid out on a 64' by 64' grid to provide spacing for a parking lot layout and to minimize the number of columns extending vertically from places other than parking stall lines. Modular structure 200 may also be laid out on a grid matching the dimensions of an existing parking lot layout and to minimize the number of columns extending vertically from places other than parking stall lines.

In an exemplary embodiment, center section 211 may be bisected in one direction by a structural beam from approximately the center of one side to approximately the center of the opposite side of center section 211. The installation of the structural beam may be configured to provide modular structure 200 with additional strength and rigidity under dead load, lift and/or shearing forces.

In another embodiment, modular structure 200 may comprise portions of the structure edged by structural beams. In one embodiment, the entire structure of modular structure 200 may be edged by structural beams. These structural beams may include, for example, I-beams, wide flange beams, square beams, tubes, and/or any other suitable structural beam or structure.

In an exemplary embodiment and with reference to FIG. 1 and FIG. 3, modular structure 300 may further comprise one or more panel supports 350. Panel support 350 may be coupled to SPHS 310 in any fashion and in any orientation. In an embodiment, panel support 350 is configured to couple to at least one of center section 311, side section 312 or corner section 313. Panel support 350 may couple to any one of center section 311, side section 312 or corner section 313 in any orientation, such as for example, at a customizable angle. In an embodiment, panel support 350 is configured to couple to and support solar energy collection panel 130. Similarly, panel support 350 may be configured to couple to and support shade panel 140.

In various embodiments and with reference to FIG. 3, FIG. 4A, FIG. 4B, and FIG. 4C, one or more solar collection panels 430 are installed in SPHS 410 at one or more panel supports 350. Solar collection panels 430 may be installed on SPHS 410 in a uniform manner. For example, solar collection panels 430 may be installed at every installation location on panel support 350 in SPHS 410 at a common angle. Similarly, solar collection panels 430 may be installed in a pattern at particular installation locations on panel support 350 in SPHS 410 at a common angle. For example, solar collection panels 430 may be arranged in a particular fashion to display a logo that can be viewed from above the structure.

In another embodiment, solar collection panels 430 may also be installed on SPHS 410 in a non-uniform manner. For example, solar collection panels 430 may be installed at some or all of the available installation locations on panel support 350 in SPHS 410 at different angles and directions. For example, rows of panels may be arranged in opposing directions such that a first group of panels receive sunlight in the morning as the sun rises and a second group of panels receive sunlight in the afternoon and as the sun sets. A third group of panels may he arranged such that they are relatively parallel with the ground so that they receive sun light during mid-day, when the sun is overhead and the intensity of the sunlight is highest. Solar collection panels 430 may be arranged in varying directions and at varying angles in a single structural module. The panels may also be arranged in varying directions and at varying angles by structural module, such that the orientation of a first group of solar collection panels 430 are consistent across of first structural module but are different from the orientation of a second group of solar collection panels 130 across a second structural module.

In another embodiment, solar collection panels 430 may be positioned and tilted in modular structure 400 at such an angle that their full length remains within the height of the edge beams. In various embodiments, solar collection panels 430 may be positioned at varying angles between approximately 5 degrees and 15 degrees. In one embodiment, solar collection panels 430 may be positioned at varying angles between approximately 5 degrees and 10 degrees. In another embodiment, solar collection panels 430 may be positioned at approximately 8 degrees. Solar energy collection panels 430 may also be positioned and tilted in modular structure 300/400 at such an angle that some portion of their length extends beyond the height of the edge beams.

In a typical solar installation in the Northern Hemisphere, solar panels are tilted to the south. As a general rule the optimal angle of panel tilt to the south approximates the latitude of the location. As an example, in the Phoenix, Ariz. area the latitude is about 33° N and solar panels might be tilted at angles approximating 30°. In addition it is important to note that the angle of the sun varies according to the season. As an example, in Phoenix, Ariz. the angle of the sun at noon varies from 32° in winter to 78° in summer. In a typical solar installation panels are spaced south to north so that the panel to the south does not shade its neighboring panel to the north even at the angle of the sun in the winter. However, when considering the design of a solar shade structure, the time the shade is most desired is in the summer. Panels placed at the optimum angle for energy collection and spaced to eliminate shading in winter would allow approximately 75% of the sunlight to reach the ground at noon in the summer.

Moreover, solar shade structures over public or private areas in urban areas need to cover an area determined by the space available. In such installations, solar panels placed at the optimal angle for efficiency per panel do not generate the optimum energy for the structure. As such, in an embodiment, modular structure 400 may comprise solar collection panels placed between approximately 5 degrees and approximately 15 degrees in order to provide adequate shade in the summer. Further, solar collection panels 430 placed at angles between approximately 5 degrees and approximately 10 degrees will allow more rows of solar collection panels 430 and generate more energy than structures with panels placed at steeper angles. As such, solar shade structures in fixed spaces may be best served with panels place at angles of 5° to 10° for two reasons; increased revenue from energy collected and increased shade provided in the summer months.

Moreover, in various embodiments, installation angles between approximately 5 degrees and approximately 15 degrees allow solar collection panels 430 to drain when subjected to rain. This range of angles may also allow panels to be arranged to allow drainage, while achieving a panel density to provide an effective amount of power output in a confined space. Where space is confined, solar collection panels may be installed at angles of less than 28 degrees to achieve more efficient power outputs. For example, where solar panels are installed as described herein, an installation with solar panels installed between approximately 5 degrees and approximately 15 degrees may yield between approximately 10 kwh/ft$^2$ and 15 kwh/ft$^2$. In an embodiment, an installation with solar panels installed at approximately 8 degrees may yield approximately 13.1 kwh/ft$^2$.

In an embodiment, the non-uniform placement of panels may be configured to achieve greater power generation efficiency based on the installation angle of each solar collection panel 430. The ability to install solar collection panels 430 at different directions and angles may increase the power generation efficiency of the structure because the panels may be individually positioned such that they are engaged by sunlight for an optimum time as the sun moves across the sky throughout the day. Panels may also be arranged in particular configurations to capture sunlight that would otherwise be obstructed if the solar collection panels 430 were otherwise installed substantially parallel to the ground.

A non-uniform arrangement of solar collection panels 430 may be desirable for environmental or aesthetic reasons. For example, the non-uniform placement of solar collection panels 430 may be configured to provide a desired lighting effect. To further achieve the desired lighting effect, solar collection panels 430 may not be installed in particular locations to allow light to pass through modular structure 300/400 and reach the ground under modular structure 300/400.

In various embodiments, one or more shade panels 440 may be installed in SPHS 310/410 at one or more panel supports 350. Shade panels 440 may be installed in SPHS 310/410 with solar collection panels 430. Shade panels 440 may be installed on SPHS 310/410 in a uniform manner. Shade panels 440 may also be installed on SPHS 310/410 in a non-uniform manner. This non-uniform arrangement of shade panels 440 may be desirable for environmental or aesthetic reasons. For example, the non-uniform placement of shade panels 440 may be configured to provide a desired lighting effect. Moreover, solar collection panels 430 and shade panels 440 may not be installed at specific installation locations along panel supports 350. The omission of panels at a particular location(s) may be desirable to provide direct sunlight to vegetation or features placed under modular structure 300/400.

In another exemplary embodiment and with momentary reference to FIG. 1 and FIG. 4B, solar collection panels 130/430 are attached, removed and serviced from underneath the solar panels. For example, the majority of, or all, panel attachment devices and support mechanisms of solar collection panel 130/430 can be accessed and operated from below the panels. Similarly, solar collection panels 130/430 can be removed from below and replaced with different and/or more efficient panels. Moreover, the supporting connections and circuitry required to use the energy created by solar collection panels 130/430, including for example, an inverter(s) 150 may be located under and shaded by modular structure 100/400. Moreover, the ability to access and service solar collection panels 130/430 facilitates greater panel density where installation space is confined because access from the top of the structure defining the confined space would require access lanes where panels could otherwise be installed. Further, in a ground installation (e.g. a solar farm) the support structure made access from the bottom of the panel impractical. Moreover, because ground installations do not generally have concerns about space, access lanes can easily be included. Thus, in an exemplary embodiment, modular structure 100/400 comprises a supporting structure that does not restrict the ability to remove and install solar collection panels, and/or similarly does not comprise access lanes.

In another exemplary embodiment, modular structure 100/400 comprises one or more sections of the structure configured to either move or rotate up or down or may be removed entirely to allow a person to move through the modular structure 100/400 to clean, service or inspect solar collection panels 130/430 and shade panels 140/440.

In an exemplary embodiment and with reference again to FIG. 3, FIG. 4A, FIG. 4B, and FIG. 4C, solar collection panels 430 and shade panels 440 may be spaced apart when installed along panel support 350. As installed, SPHS 310/410 may be installed at a height of 18 feet or more. As a result, SPHS 310/410 may be subjected to increased air flow from wind. While this airflow does provide cooling, it may also exert forces, including for example, lift forces and shearing forces on SPHS 310/410. As such, solar collection panels 430 and shade panels 440 may be spaced apart. This spacing allows the airflows to pass through SPHS 310/410, which reduces the lift and/or shearing forces exerted on SPHS 310/410.

Figure 5A:
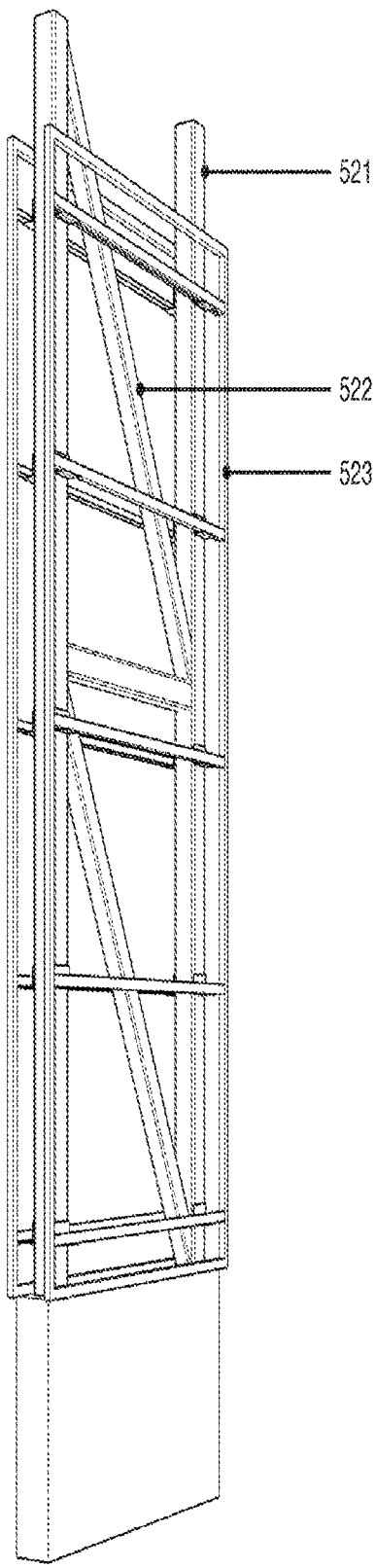
FIG. 5A illustrates a perspective view of an uncladded brace-frame in accordance with an exemplary embodiment.
Figure 5B:
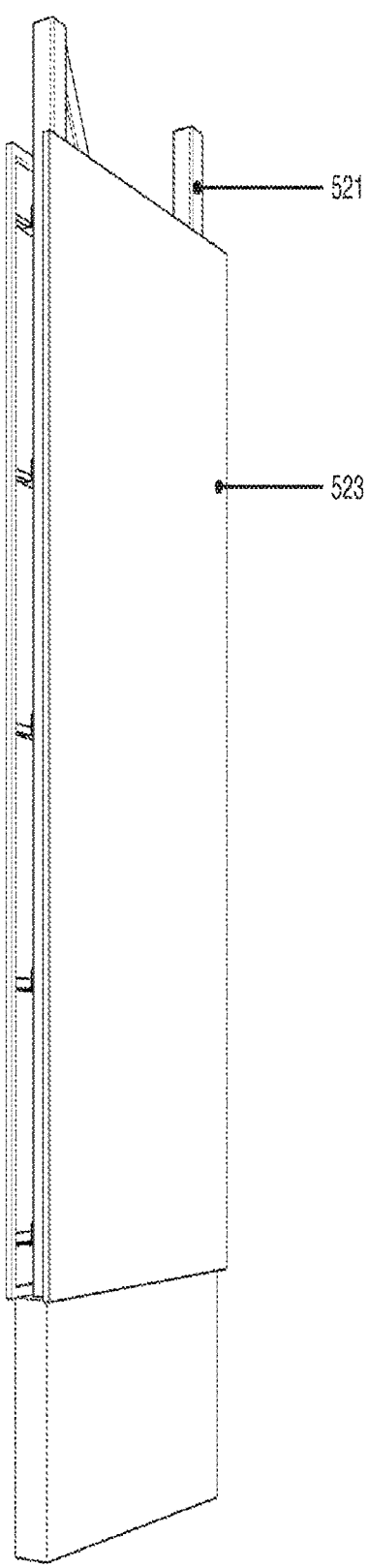
FIG. 5B illustrates a perspective view of an cladded brace-frame in accordance with an exemplary embodiment.

In an embodiment and with reference to FIG. 2, FIG. 5A and FIG. 5B, the vertical support may be configured as a brace-frame 520. One or more brace-frames 520 may be installed at any locations to support and restrain modular structure 200. In various embodiments, the dead load of modular structure 200 is isolated from the lateral load of modular structure 200. More specifically, as assembled, modular structure 200 has a unitary construction. As such, the lateral forces exerted on modular structure 200 are translated by the structure to every point on the structure. Therefore, these lateral forces may be counteracted at any point on the structure. This configuration reduces the structural requirements of the vertical column supports 220/320/420 by making use of brace-frame 520 to resist the lateral forces of the modular structure 200. In an embodiment, lateral brace-frames are placed in an x and y orientation on every beam line thereby creating lateral stability. For example, center section 311 may be supported above the ground (or other structural surface) by two (2) or more vertical column supports 420 and by two (2) or more lateral brace-frames 520. Moreover, brace-frames 520 may comprise a cladding support 522 and cladding 523. Cladding 523 may be used as signage elements to provide decorative graphics and/or advertising space. Brace-frames 520 may be configured with signage elements that include, for example, backlit signs and electronically controlled signs.

Figure 6A:
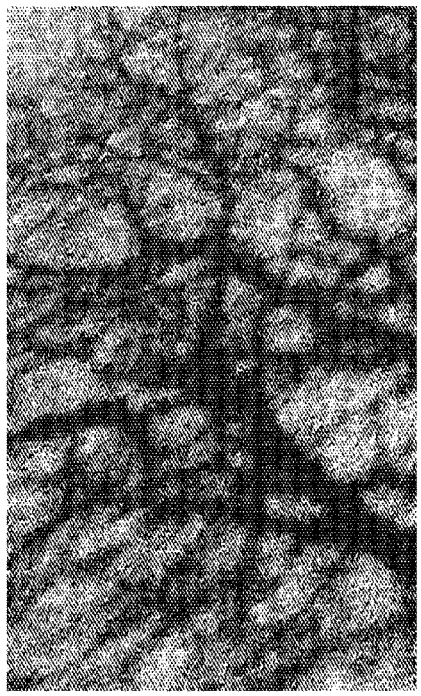
FIG. 6A-FIG. 6D illustrate an exemplary method of creating the spacing of the shade panels from a pattern yielded from the process of pixilation of photographs of the shade profile of a tree.
Figure 6B:
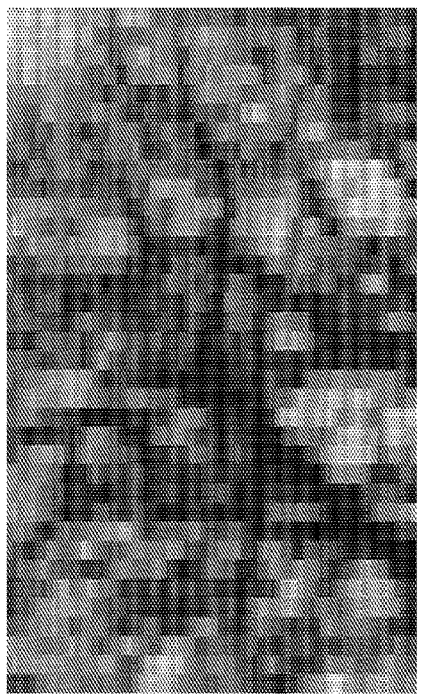
Figure 6C:
Figure 6D:

In an exemplary embodiment and with reference to FIGS. 4A, 4B, 4C and FIGS. 6A through 6C, solar collections panels 430 and shade panels 440 may be arranged to simulate a natural environment. Moreover, FIGS. 6A through 6D show an exemplary process for laying out solar panels in SPHS 410. For example and with reference to FIG. 6A, the shadow of a tree branch may be photographed. That photograph may be pixilated to create an approximation of the tree shadow. This approximation of the tree shadow can be further adjusted, as shown in FIG. 6C and FIG. 6D, to achieve the desired shade coverage and power output. Adjustments may be made based on a variety of factors. For example: (1) solar collection panels 430 may be added to increase the overall power generation of modular structure 400; (2) solar collection panels 430 and shade panels 440 may be removed to decrease the weight of modular structure 400; (3) solar collection panels 430 and shade panels 440 may be removed to decrease the effect of lift or shearing force on modular structure 400; (4) solar collection panels 430 and shade panels 440 may be removed to increase the amount of light that reaches vegetation or structures under modular structure 400; and/or (5) solar collection panels 430 and shade panels 440 may be added or removed to achieve a desired lighting effect (e.g. dappling or stippling of light) under modular structure 400. Although the dappling pattern may be based off of a photograph, any suitable method of arriving at the pattern of solar panels and/or shade panels can be used.

Figure 7A:
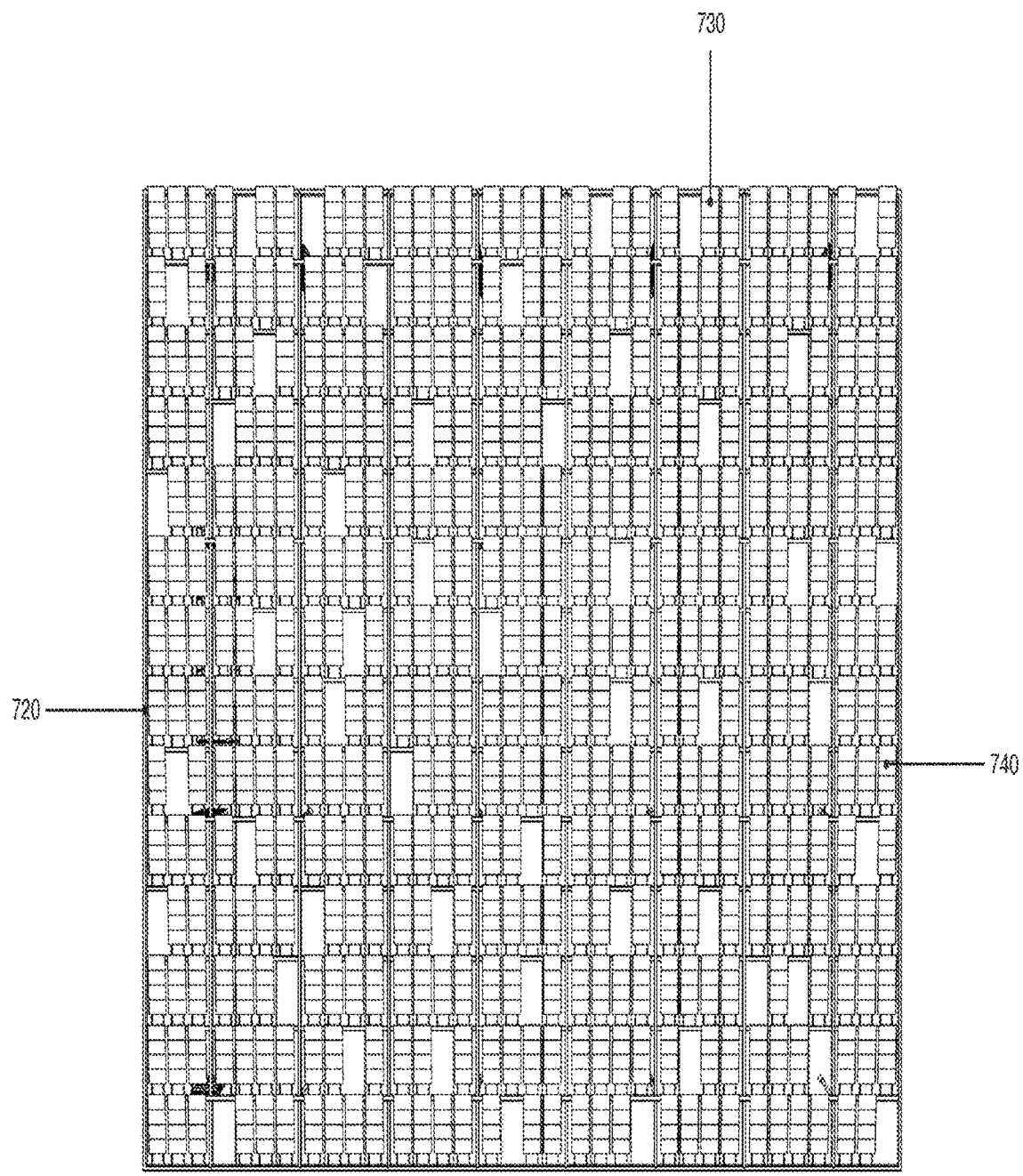
FIG. 7A illustrates a top view of an exemplary modular structure loaded with solar panels in accordance with the design plan.
Figure 7B:
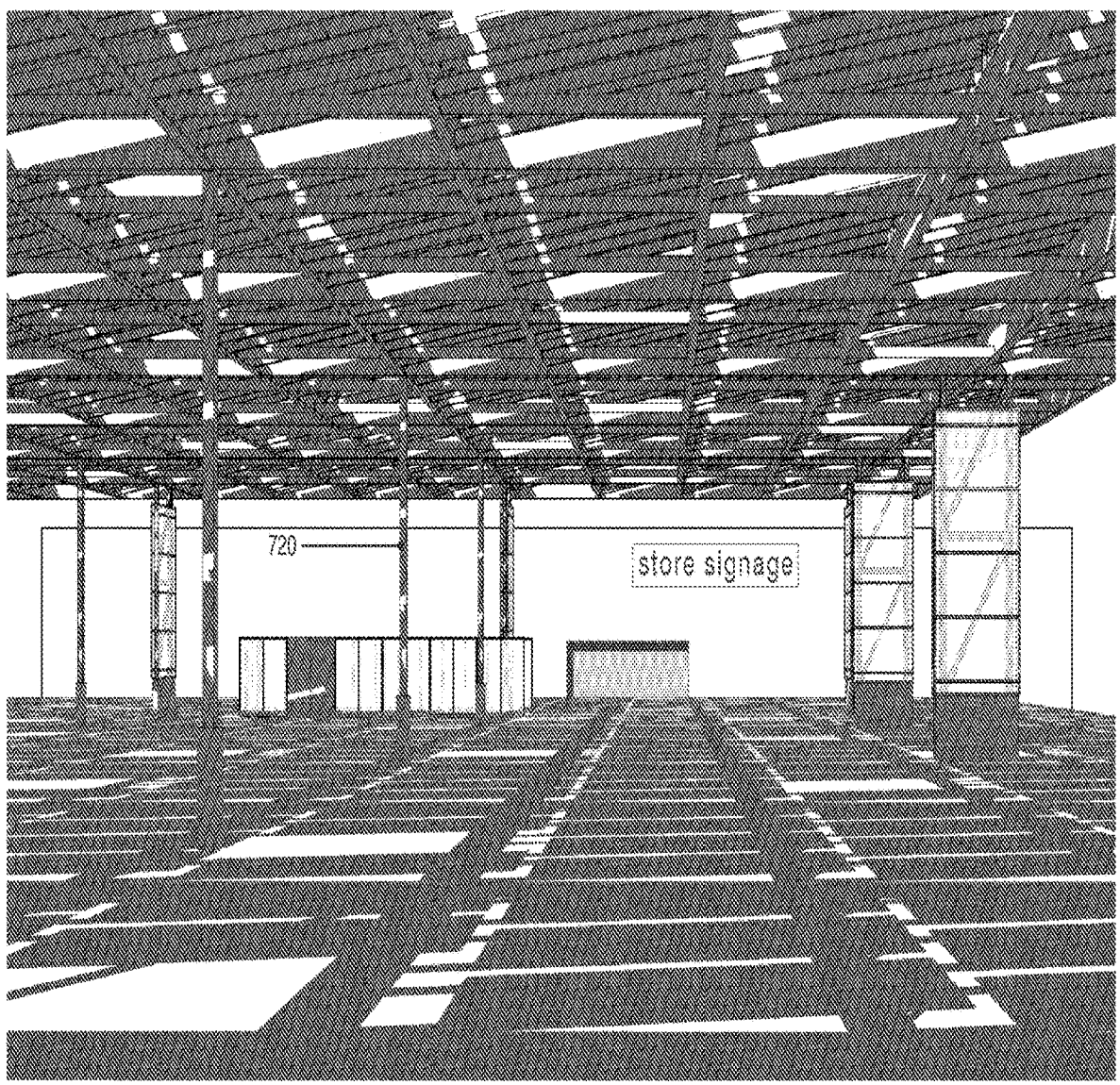
FIG. 7B illustrates a perspective bottom view of an exemplary modular structure loaded with solar panels in accordance with the design plan to provide dappled light and installed in front of a store front.

In an embodiment and with reference to FIG. 7A and FIG. 7B, solar collection panels 730 and shade panels 740 may be arranged in any suitable way to achieve a desired environmental effect. Similarly, the spacing between panels in SPHS 720, the ability to achieve customizable lighting arrangements, and the increased height of modular structure 700 provide a more pleasing experience for a user under the structure.

In an embodiment, the increased height of SPHS 720, due to the vertical supports, also provides greater visibility underneath the shade structure. For example, where modular structure 700 is installed over a parking lot in front of a store, the user of the parking lot is able to see the store front from beneath the modular structure 700. Conventional shade structures over parking lots are generally low enough that they at least partially obstruct the view of the store front from the parking lot. This visibility of the store front is useful in advertising and/or promoting the store. This visibility is also useful for the consumer to maintain their bearings and/or find the store the consumer is looking for. In an exemplary embodiment, the enhanced visibility, the openness of the space underneath modular structure 700, and/or the security cameras provide an environment of enhanced safety for the people under the structure. These features are also more likely to have a deterrent effect on theft, assault, vandalism, and other crime or mischief.

In an embodiment, installation of modular structure 100 may be used to generate revenue and offset the cost of producing solar energy. For example, signage may be attached to modular structure 100 in various locations. Signage may include advertising, information signs, and the like. Signage may be electronic media or printed in any fashion. In the form of advertising, revenue from the signage may be used to reduce or offset the cost of solar energy produced. In an embodiment, modular structure 100 is configured to provide shade. This shade may also be used to offset or reduce the cost of solar energy produced. For example, where modular structure 100 is installed over a parking lot, the parking lot owner may charge a fee to park in a shaded space. At least a portion of the revenue generated by the parking fees may be used to offset the cost of the solar energy produced. In an embodiment, modular structure 100 may be installed at a location as a result of donations. For example, modular structure 100 may be installed on a school campus, museum, zoo or similar location. Supporters of the location or associated organization may be given the opportunity to buy solar panels or donate toward the cost of solar panels or modular structure 100 construction. At least a portion of the revenue from the donations may be used to offset the cost of the solar energy produced. Given the height and size of the structure, revenue may also be generated by allowing antennas to be installed on the structure, by charging fees for using the space under the structure, by charging fees for locating electric car charging stations under the structure and/or the like. At least a portion of the revenue may be used to offset the cost of generating solar energy.

In an embodiment, a method of designing a solar structure may comprise capturing a shade profile of a natural element as a photograph; pixilating the photograph; adjusting a contrast ratio of the pixilated photograph based on a set of predetermined factors to achieve a design plan; and designing an arrangement of a plurality of solar collection panels to correspond to the design plan. In one embodiment, the plurality of solar collection panels may be installed on a structure in accordance with the design plan in a public area. In an embodiment, the predetermined factors include at least one of lifting force load, shearing force load, desired lighting effects, and weight requirements.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments.

However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

In an example embodiment, a solar energy shade structure, comprises: a structure installed over a public area and configured to support and retain a plurality of solar panels, wherein the structure further comprises a plurality of vertical supports; wherein the majority of the plurality of solar panels are supported by the structure at an angle of approximately 5 degrees to approximately 15 degrees from level, and wherein the plurality of solar panels are spaced apart such that natural light is permitted to pass through the structure.

In a further example embodiment, each of the vertical supports is sufficiently long to support the horizontal portion of the structure at least 18 feet above a surface of the public area.

In a further example embodiment, the solar energy shade structure further comprises electricity conditioning equipment, wherein the electricity conditioning equipment is positioned under the structure such that they are cooled and protected by the shade.

In a further example embodiment, the structure is configured to support a non-energy producing element; wherein the non-energy producing element is at least one of a sign, an antenna, an information system, a television, an interactive, an electric car charging apparatus, and a security camera.

In an example embodiment, a solar panel system comprises: a center structure having a generally rectangular shape having a first length and a first width; a first plurality of solar panels attached to the center structure and retained by the center structure at an angle of approximately 5 degrees to approximately 15 degrees from level; a first support structure fixedly attached to a first corner of the center structure, wherein the first support structure has a length sufficient to support the center structure at least 18 feet above the surface of a public area; a side structure comprising a generally rectangular shape having a second length and a second width and coupled to the center structure in a cantilevered configuration, wherein the first length of the center structure corresponds to the second length of the side structure; and a corner structure comprising a generally rectangular shape have a third length and a third width and coupled to the side structure in a cantilevered configuration, wherein the second width of the side structure corresponds to the third width of the corner structure.

In a further example embodiment, the center structure provides a dappled shade effect when subjected to sunlight, and the desired lighting profile is an approximation of a shade profile of a natural element.

In a further example embodiment, the solar panel system is further configured to be maintained by a method, comprising: providing the solar panel system over a surface of a public area, wherein the solar panel system further comprises a top side facing the sun and an opposing bottom side, and wherein the plurality of solar panels are installed on the top side in an arrangement to produce between approximately 10 kwh/ft$^2$ and approximately 15 kwh/ft$^2$, and wherein the plurality of solar panels are accessible from the bottom side of the solar structure; accessing a retaining mechanism from the bottom side, wherein the retaining mechanism is configured to attach the solar panel to the center structure; disconnecting the solar panel from the retaining mechanism; and removing the solar panel from the center structure through the bottom side.

In a further example embodiment, the solar energy shade structure is configured for installation over an existing parking lot, is configured for installation over trees, and is configured such that the structure, with the exception of one or more vertical supports of the structure, does not obstruct a pedestrian's view of store front signage proximate to the structure.

In a further example embodiment, a solar structure is configured to provide a dappled light pattern beneath the solar structure, wherein the dappled light pattern is an approximation of a natural element.

We claim:

1. A solar energy shade structure, comprising:
   a planar solar panel support structure comprising a first plurality of structural beams extending in a first direction and a second plurality of structural beams extending in a second direction, wherein the first plurality of structural beams and the second plurality of structural beams define a first plane and form a planar arrangement of intersecting structural beams in said first plane;
   a plurality of solar panels;
   a plurality of elongated structural members coupled to the planar solar panel support structure, the planar solar panel support structure supporting each solar panel of the plurality of solar panels with at least one elongated structural member from the plurality of elongated structural members, wherein each solar panel of the plurality of solar panels is attached to the at least one elongated structural member such that each solar panel of the plurality of solar panels is stationary relative to the planar solar panel support structure; and
   a plurality of vertical supports connected to the planar solar panel support structure for supporting the planar solar panel support structure elevated above a surface, wherein the solar energy shade structure contiguously covers a first area type and a second area type that is different from the first area type,
   wherein one of the plurality of solar panels is a front panel, and another of the plurality of solar panels is a rear panel, wherein the solar energy shade structure has a panel density in a third direction, wherein the third direction is along a line extending from the front panel to the rear panel, and wherein the panel density is greater when fixing the front panel at a fixed angle that is inclined at less than 15 degrees relative to a horizontal plane than when the plurality of solar panels are inclined at an angle that is optimal for energy generation of a respective solar panel in the plurality of solar panels.

2. The solar energy shade structure of claim 1, wherein the solar energy shade structure contiguously covers a first group of parking spaces, a second group of parking spaces and a drive aisle with an arrangement of the plurality of solar panels that is uninterrupted by the drive aisle.

3. The solar energy shade structure of claim 2, wherein the planar solar panel support structure contiguously covers walkways.

4. The solar energy shade structure of claim 1, wherein an arrangement of the plurality of solar panels is uninterrupted by service or access lanes.

5. The solar energy shade structure of claim 1, wherein the fixed angle is non-optimal for generating energy in favor of creating shade.

6. The solar energy shade structure of claim 1, wherein the plurality of solar panels are attached to the planar solar panel support structure such that each of the plurality of solar panels can be installed, serviced, and removed from below the planar solar panel support structure, and wherein a height of the planar solar panel support structure, as measured between the surface and a bottom side of the planar solar panel support structure, is at least 18 feet.

7. The solar energy shade structure of claim 1, wherein the plurality of solar panels, on the planar solar panel support structure, are supported with spacing between at least some of the plurality of solar panels to allow sunlight to pass through the solar energy shade structure.

8. The solar energy shade structure of claim 1, wherein each solar panel in the plurality of solar panels is disposed adjacent to an adjacent solar panel in the plurality of solar panels, each panel being separated from the adjacent solar panel by a fixed gap in the first plane.

9. The solar energy shade structure of claim 1, wherein the first area type and the second area type are selected from a group consisting of: a parking spot, a driveway between parking spots, an aisle, a walkway, and a gathering area.

10. A solar energy shade structure, comprising:
a contiguous solar panel support structure comprising a first plurality of structural beams extending in a first direction and a second plurality of structural beams extending in a second direction, wherein the first plurality of structural beams and the second plurality of structural beams define a first plane and form a planar arrangement of intersecting structural beams in said first plane, and wherein the contiguous solar panel support structure is supported by a plurality of vertical supports above a surface; and
a plurality of solar collection panels, each solar collection panel extending from a structural beam in the first plurality of structural beams to an elongated structural member coupled to an adjacent structural beam in the first plurality of structural beams such that each solar collection panel in the plurality of solar collection panels is stationary relative to the contiguous solar panel support structure, each solar collection panel comprising:
a plurality of solar panels, each solar panel in the plurality of solar panels disposed adjacent to an adjacent solar panel in the plurality of solar panels, wherein one of the plurality of solar collection panels is a front panel, and another of the plurality of solar collection panels is a rear panel, wherein the solar energy shade structure has a panel density in a third direction, wherein the third direction is along a line extending from the front panel to the rear panel, and wherein the panel density is greater when a fixed angle is less than 15 degrees relative to a horizontal plane than when the plurality of solar collection panels are inclined at an angle that is optimal for energy generation of a respective solar panel in the plurality of solar panels.

11. The solar energy shade structure of claim 10, wherein the solar energy shade structure contiguously covers a first group of parking spaces, a second group of parking spaces and a drive aisle with an arrangement of the plurality of solar collection panels that is uninterrupted by the drive aisle.

12. The solar energy shade structure of claim 10, wherein wherein the fixed angle is non-optimal for generating energy in favor of creating shade, and wherein a height of the contiguous solar panel support structure, as measured between the surface and a bottom side of the contiguous solar panel support structure, is at least 18 feet.

13. The solar energy shade structure of claim 10, wherein a majority of the plurality of solar collection panels are fixed at the angle that is non-optimal for energy generation of a respective solar panel in the majority of the plurality of solar collection panels, but results in optimal power density for the solar energy shade structure.

14. The solar energy shade structure of claim 10, wherein each solar collection panel in the plurality of solar panels is disposed adjacent to an adjacent solar collection panel in the plurality of solar collection panels, each solar collection panel being separated from the adjacent solar collection panel by a fixed gap in the first plane.

15. A solar energy shade structure, comprising:
a contiguous solar panel support structure comprising a first plurality of structural beams extending in a first direction and a second plurality of structural beams extending in a second direction, wherein the first plurality of structural beams and the second plurality of structural beams define a first plane and form a planar arrangement of intersecting structural beams in said first plane, and wherein the contiguous solar panel support structure is supported by a plurality of vertical supports above a surface; and
a plurality of solar collection panels, each solar collection panel extending from a structural beam in the first plurality of structural beams to an elongated structural member coupled to an adjacent structural beam in the first plurality of structural beams such that each solar collection panel in the plurality of solar collection panels is stationary relative to the contiguous solar panel support structure, each solar collection panel comprising:
a plurality of solar panels, each solar panel in the plurality of solar panels disposed adjacent to an adjacent solar panel in the plurality of solar panels, the solar energy shade structure further comprising:
a retaining mechanism configured to attach a solar collection panel of the plurality of solar collection panels to the contiguous solar panel support structure, wherein the retaining mechanism is accessible from underneath the solar collection panel for attaching and detaching solar collection panels, from the contiguous solar panel support structure, from beneath the solar collection panel, and wherein the contiguous solar panel support structure comprises openings through which the solar collection panel can be passed when installing or removing the solar collection panel, the solar collection panel being rotatable such that the solar collection panel can be passed through the openings between a top side of the contiguous solar panel support structure and a bottom side of the contiguous solar panel support structure when installing or removing the solar collection panel.

* * * * *